United States Patent [19]

Werner

[11] Patent Number: 4,656,721

[45] Date of Patent: Apr. 14, 1987

[54] APPARATUS AND METHODS FOR MAKING RAIL-TO-RUNG JOINTS FOR LADDERS AND JOINTS FOR OTHER STRUCTURAL ELEMENTS

[75] Inventor: Richard L. Werner, Sharon, Pa.

[73] Assignee: R. D. Werner Co., Inc., Greenville, Pa.

[21] Appl. No.: 672,992

[22] Filed: Nov. 19, 1984

[51] Int. Cl.[4] .............................................. B23P 11/02

[52] U.S. Cl. ........................................ 29/523; 29/509; 29/512; 182/228

[58] Field of Search ......................... 29/523, 512, 509; 182/228

[56] References Cited

U.S. PATENT DOCUMENTS

| | | | |
|---|---|---|---|
| 2,618,427 | 11/1952 | Langley et al. | 182/228 |
| 3,318,413 | 5/1967 | Werner et al. | 182/228 |
| 3,327,385 | 6/1967 | Shaver | 29/512 |
| 3,354,987 | 11/1967 | Werner et al. | 29/523 |
| 3,477,120 | 11/1969 | Werner et al. | 29/523 |
| 3,484,931 | 12/1969 | Lindesmith et al. | 29/523 |
| 3,566,992 | 3/1971 | Berger | 182/228 |

*Primary Examiner*—Howard N. Goldberg
*Assistant Examiner*—Irene Graves Golabi
*Attorney, Agent, or Firm*—J. Helen Slough

[57] ABSTRACT

A rung-to-rail ladder joint connection for box section or tubular side rails comprising a rung, a malleable ferrule disposed on an end of the rung, the ferrule and rung projected through an opening in the web of each of the walls of the side rails, a sleeve or sleeve-like reinforcing member of lesser length than the ferrule and of similar profile thereto telescoped over the ferrule and disposed between the webs of the rails, the sleeve being adapted to be disposed on the ferrule either during preforming a flange on one end of the ferrule or thereafter and prior in each instance to final assembly with the box section or tubular side rails by forming of a flange on an opposite end of the rung. The sleeve and the ferrule may be of the same or different materials and thickness.

5 Claims, 21 Drawing Figures

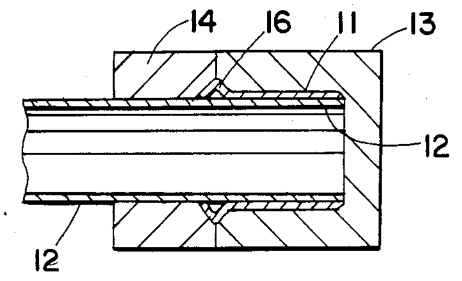
Fig. 1
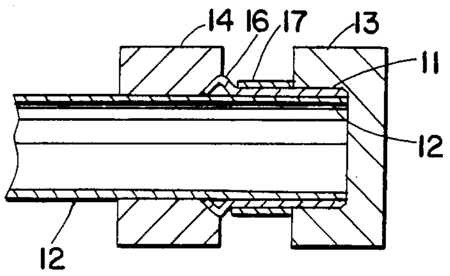
Fig. 2
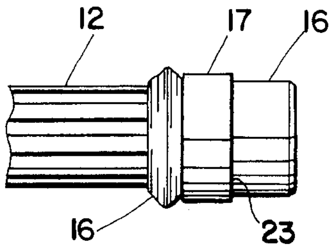
Fig. 4
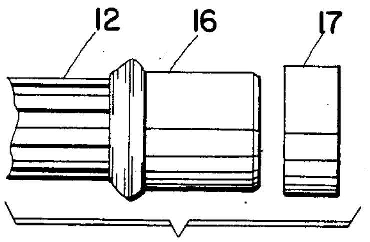
Fig. 3
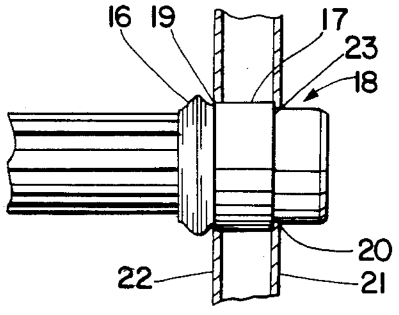
Fig. 5
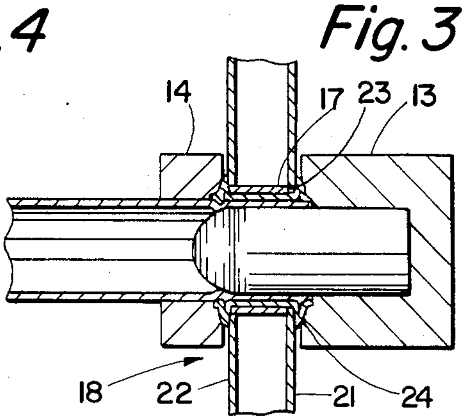
Fig. 6
Fig. 7
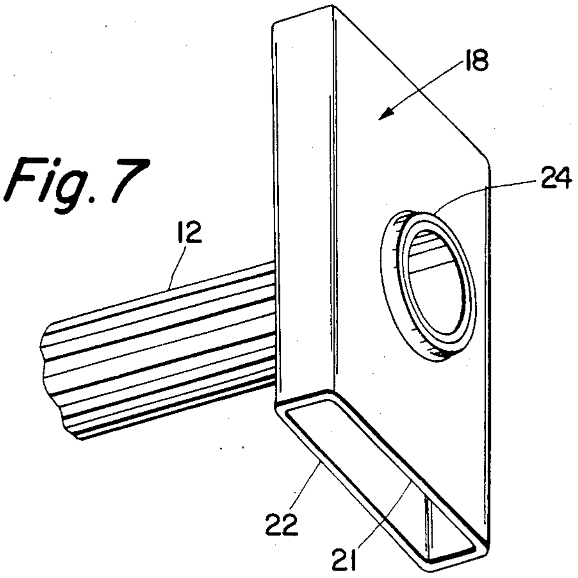

APPARATUS AND METHODS FOR MAKING RAIL-TO-RUNG JOINTS FOR LADDERS AND JOINTS FOR OTHER STRUCTURAL ELEMENTS

This invention relates more particularly to ladders and means for attaching rungs thereto where the side rails are tubular or of box-section, and methods of forming joints between the side rails and rungs of such ladders.

In the prior art as disclosed in Stoyer U.S. Pat. No. 3,039,186, assigned to assignee of the present inventors, patentee utilized three parts or members to achieve a secure stress and strain resistant ladder joint, viz. a rail part, a rung, a ferrule positioned over one end of the rung, the rung projected through an opening in a rail, opposed compression force being applied on the opposite ends of the ferrule thereby flowing metal from either end of the ferrule radially-outwardly into tight engagement with portions of the rail surrounding either side of the opening and into tight engagement with the one end portion of the rung, deforming a latching valley in the wall of the rung end portion.

In prior U.S. Pat. Nos. 3,528,525 and 3,500,956 to Lindesmith, et al, also assigned to the present assignee, the three part rung-to-rail joints are formed by disposing double annular nodes formed respectively from the ferrule telescoped on the rung on either side of the opening in the side rail or by shear flowing flanges formed from the ferrules about the surfaces surrounding the opening. In U.S. Pat. No. 3,477,120 to assignee, the ferrule is provided with a radially preformed flange on one end prior to insertion of the ferrule through an opening in the side rail and prior to flowing the metal or shearing forming the same to form a second flange surrounding the opening in the rail.

In U.S. Pat. No. 3,318 413 to assignee a pair of ferrules each having a preformed annulus on opposite ends thereof, are in telescoped relationship with the rung to form the rail-to-rung joint between the rungs and tubular rectangular side ladder rails.

U.S. Pat. No. 3,208,554 to Arnold discloses hollow rungs aligned with opposed openings in hollow elliptical side rails, a sleeve having one enlarged end slidably received into each open end of the rung so that the said enlarged end engaged the outer surfaces of the rail and the rungs which do not enter the rail. In Arnold a spool like member is slidably mounted over the sleeve inside the rail and abuts the inner surface of the side walls of the elliptical side rail. Bolt means are projected through the hollow rung and the sleeve on opposite sides of the ladder to bias the sleeves together and to hold the rungs in position on the side rails

SUMMARY OF THE INVENTION

The present invention provides improvements over U.S. Pat. Nos. 3,039,186; 3,528,525; 3,500,956; 3,354,987; and 3,477,120 which patents all disclose three-part rail to rung joints in which ferrules are telescoped over hollow rungs and the end portions of the ferrules are formed with flanges, which flanges abut rail surfaces surrounding openings in the ladder rail In the present invention the ferrules used to secure the rungs to the rails are used in ladders having tubular or box-section side rails, the rungs project through aligned openings in the spaced opposite side walls of the rail and additional means such as a sleeve or band is telescoped over the ferrule to improve the strength of the side rails and to achieve a secure and rigid rail-to-rung joint which is twist-resistant when the ladder is in use. The additional means or sleeve acts as a reinforcement or back-up means for the ferrule during swaging of the ends thereof and/or in forming flanges on ends of the ferrule for the joint connection and to prevent collagse of the walls of the rails. It further acts as a constraining or constricting band for the ferrule and is either a continuous or non-continuous band and controls radial expansion of the ferrule in the rail-to-rung joints. It permits also effective control of the material for greater strength, ductibility and formability of the ladder.

Other objects of the invention itself will become more readily apparent from a reading of the detailed specification and the accompanying drawings forming a part thereof, wherein:

In which drawings;

FIG. 1 is a fragmentary view, partly in section showing a portion of a ladder rung and ferrule, a pair of dies being shown in closed position after preforming an end of the ferrule, the ferrule being maintained on and flush with the end of the rung;

FIG. 2 is a view similar to FIG. 1, showing the dies in open position and showing a sleeve mounted on the ferrule and abutting the preformed annulus of FIG. 1;

FIG. 3 is an exploded view of the rung, ferrule and sleeve of FIG. 2 prior to slidably mounting of the sleeve thereon;

FIG. 4 is a plan view of the rung, ferrule and sleeve assembly of FIG. 2 after mounting of the sleeve thereon;

FIG. 5 is a plan view showing the rung, preformed ferrule and sleeve assembly of FIG. 4 projected through aligned openings in opposite sides of a box-like rail;

FIG. 6 is a sectional view showing the rung, ferrule, and sleeve assembly of FIG. 4 after projection of the same through the aligned openings in the tubular ladder rail and showing compression dies in closed position after forming a flange on an opposite end of the ferrule to the end with the preformed annulus;

FIG. 7 is a perspective end view of the rail-to-rung joint of FIG. 6;

Figure 8:
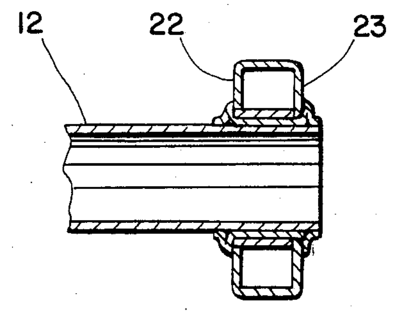
Figure 9:
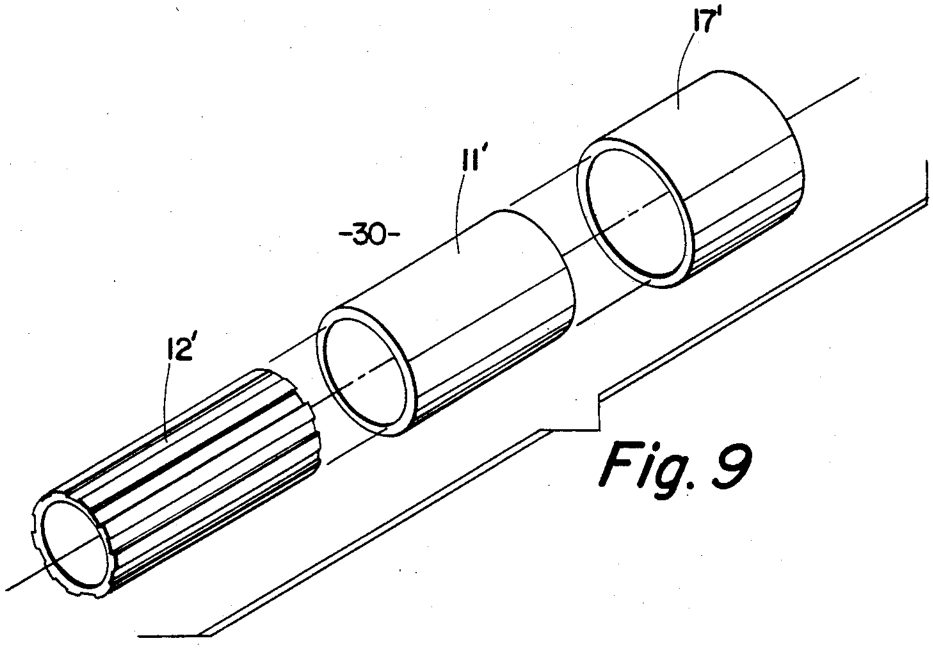
Figure 10:
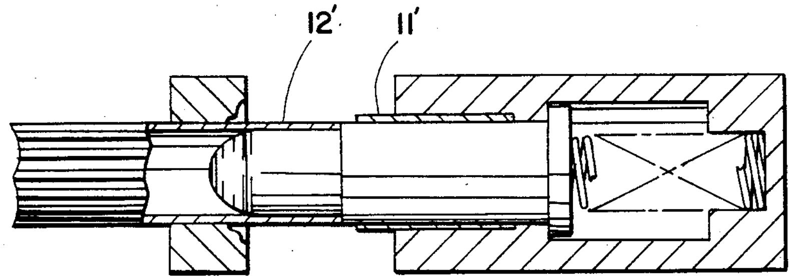
Figure 11:
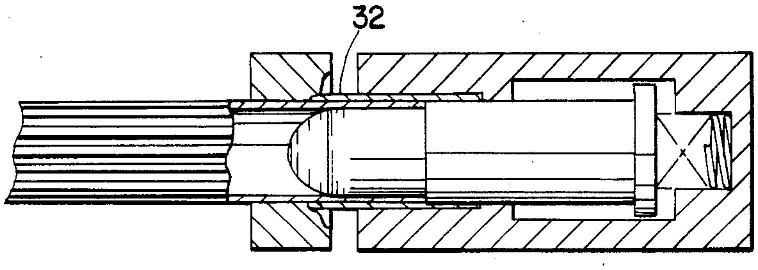
Figure 12:
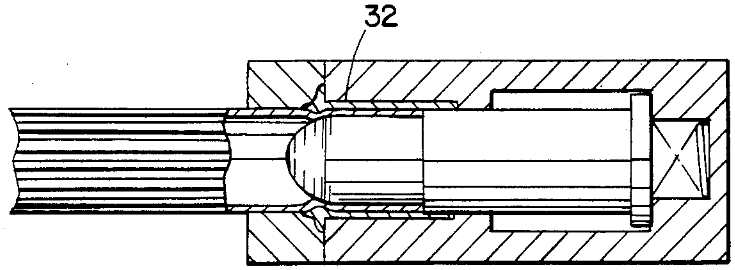
Figure 13:
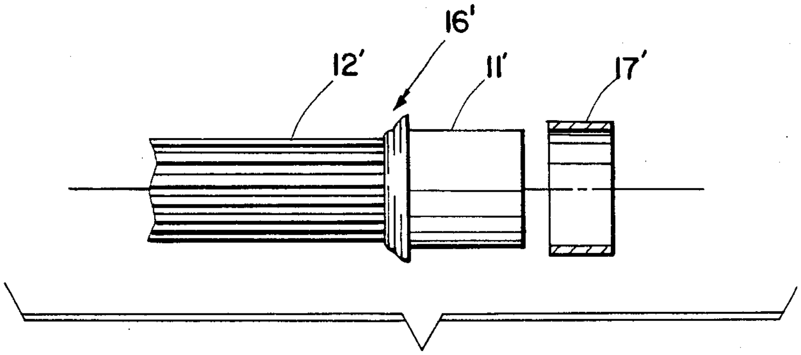
Figure 14:
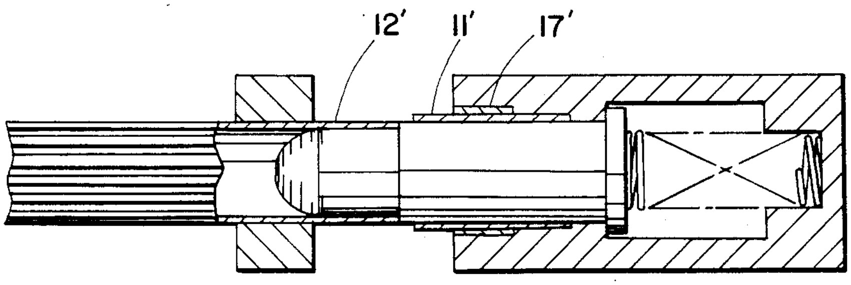
Figure 15:
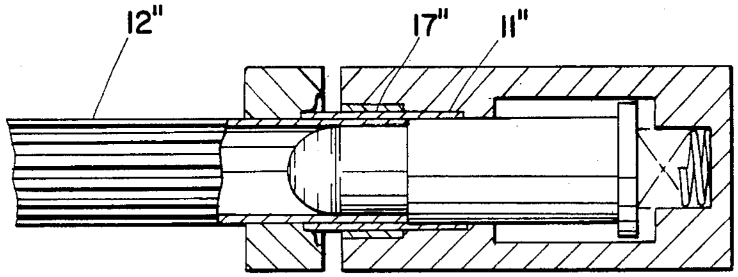
Figure 16:
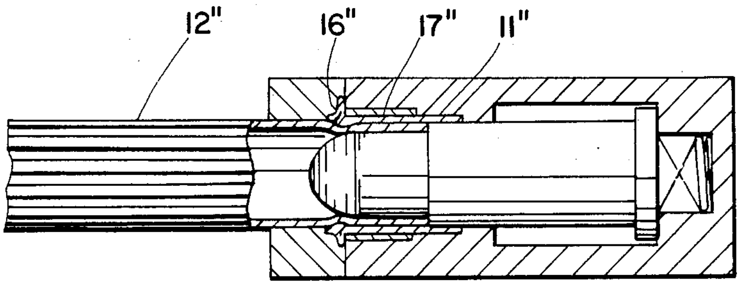
Figure 17:
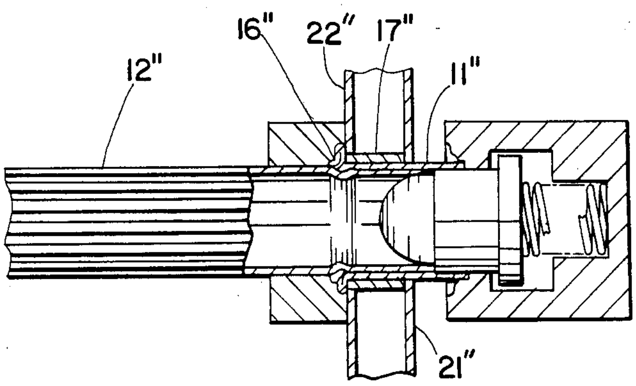
Figure 18:
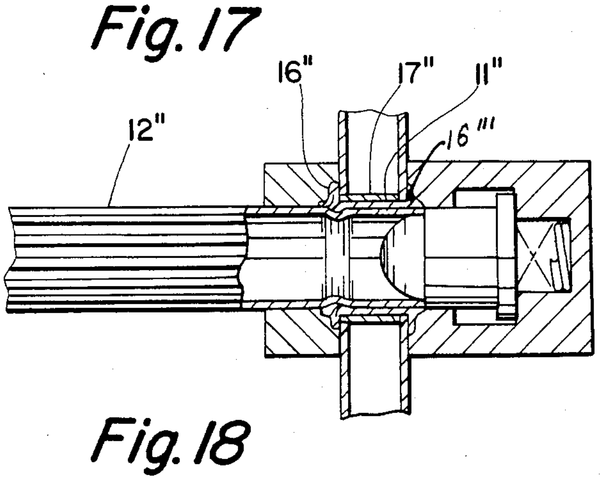
Figure 19:
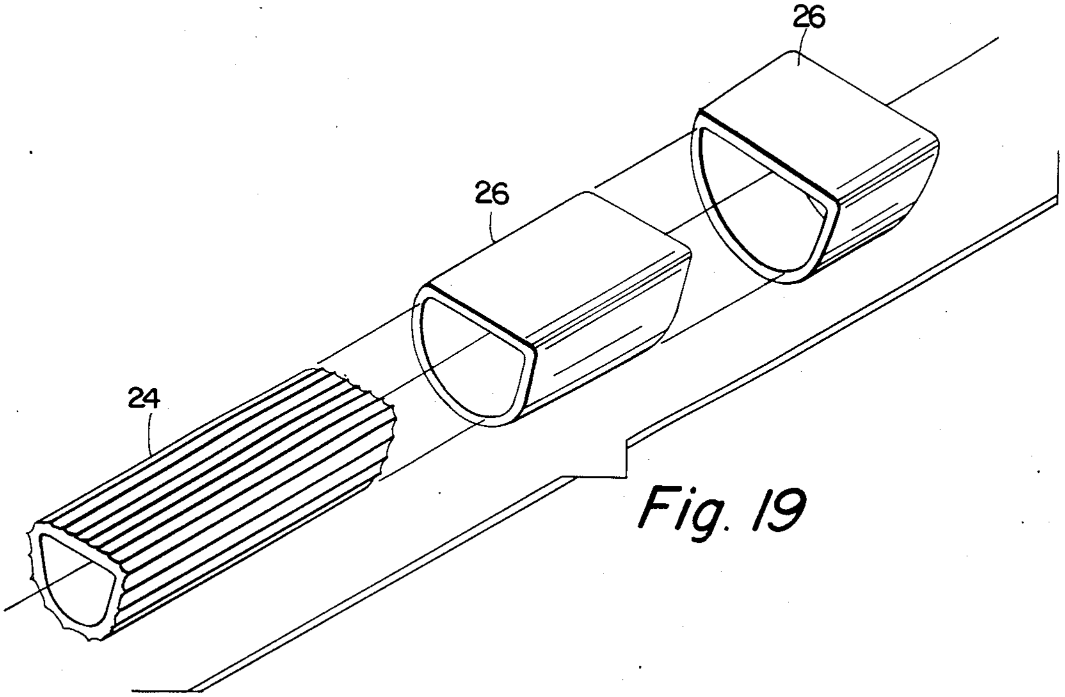
Figure 20:
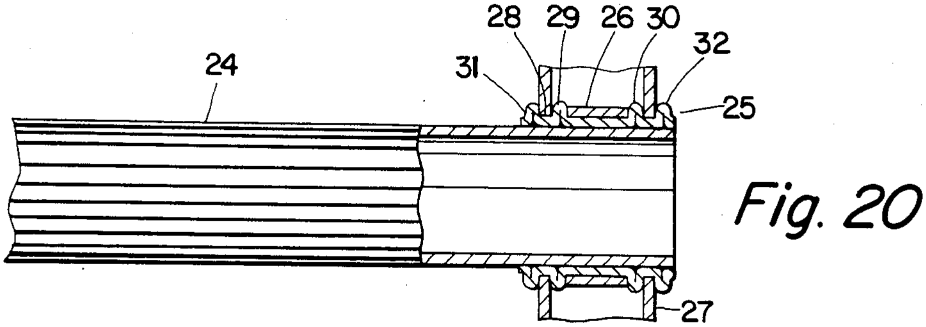
Figure 21:
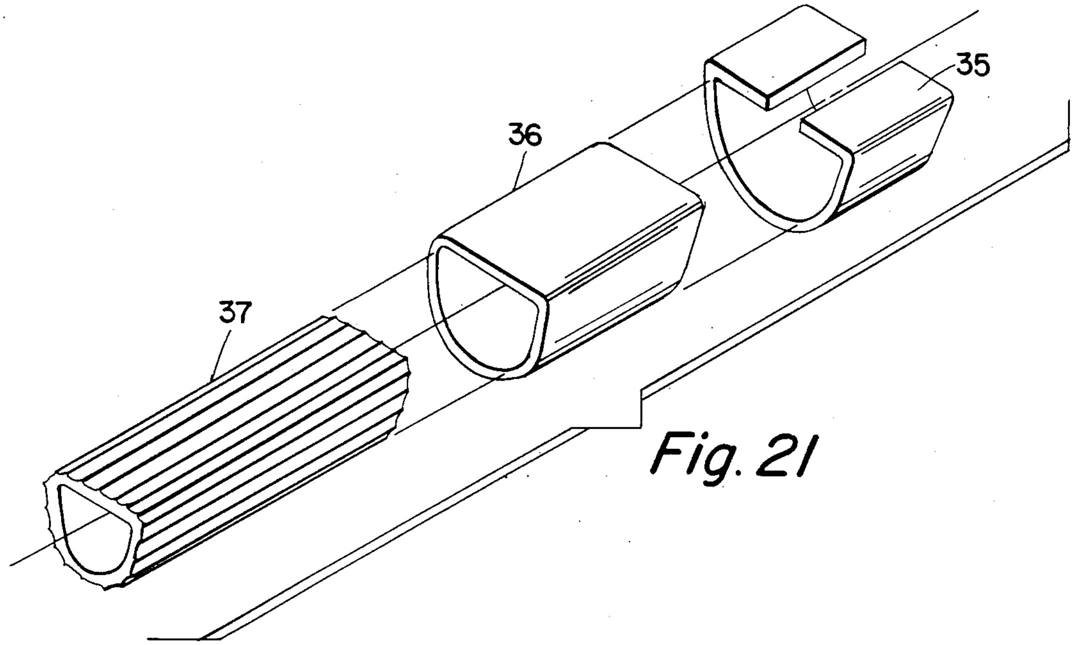

FIG. 8 is a sectional view of the rung, ferrule and sleeve assembly of FIG. 6 secured by swaging, as taught by U.S. Pat. No. 3,039,186, to a tubular rail rather than a channel shaped rail, the opening in one of the opposite sides of the rail sections being larger than the opening in the other side and the sleeve abutting an inner surface of one side of the rail and on the other end the preformed annulus of the assembly;

FIG. 9 is an exploded view of a rung, ferrule and sleeve of a second embodiment of this invention;

FIGS. 10, 11 and 12 are successive sectional views of the steps for preforming an annulus on one end of a ferrule overhanging an end of a ladder rung as shown in U.S. Pat. No. 3,477,120;

FIG. 13 is an exploded end view of the rung and ferrule assembly of FIG. 12 showing a sleeve in spaced relation to the rung and ferrule assembly of FIG. 12 for slidable mounting of the sleeve on the ferrule and rung assembly of FIG. 12;

FIGS. 14, 15 and 16 are successive sectional views of dies adapted to preform an annulus on an end of the ferrule, the ferrule overhanging an end of the rung as shown in FIG. 12 and having the sleeve shown in FIG. 13 mounted about a mid-portion of the ferrule;

FIG. 17 is a sectional view disclosing the rung, ferrule and sleeve (the sleeve abutting an inner face of rail portions surrounding an opening in the rail to reinforce the same) and assembled as shown in FIGS. 10, 11, 12, 13 or, as shown in FIGS. 14, 15 and 16, projected through opposed openings in the rails, the swaging dies being shown set for swaging the overhanging ferrule portion;

FIG. 18 is a sectional view of the swaged ferrule and rung and sleeve assembly of FIG. 17 showing an annulus formed from the overhanging ferrule portion surrounding the outer surfaces of the rail wall surrounding the opening on the wall opposite the wall against which the preformed annulus of FIGS. 16 and 17 abuts;

FIG. 19 is an exploded view similar to FIG. 9 of another embodiment of my invention;

FIG. 20 is a sectional view of an assembly of the parts illustrated in FIG. 19; and FIG. 21 is an exploded view of parts of a rail-to-rung joint showing an alternate form of sleeve or constrictive strip or band adapted to be telescoped over the ferrule and rung.

Referring now to the drawings, in all of which like parts are designated by like reference characters, in FIGS. 1 to 6. I have shown the first form of my invention wherein a ferrule 11 is shown telescoped over and flush with an end of a serrated lengthwise-extending, ladder cross rung member 12.

In the first step of the joint assembly a ferrule is slidably mounted on an end of the rung and preferably the inner diameter of the ferrule is slightly larger than the outer diameter of the rung. In the next step of the operation, the ferrule and rung assembly is aligned, as shown in FIG. 1, with respect to forming die members 13, 14. The gripping jaws or dies 13, 14 are adapted to be operated to provide end pairs for gripping the assembled parts 11, 12. The jaws 14, 13 are provided with cavities to provide swaging die faces to preform an annulus 16 on an end of the ferrule, the ferrule first being gripped endwise and then endwise swaged. The dies 13, 14 are moved axially inwardly during this step of the operation and are shown in FIG. 1 in closed position. In open position the dies 13, 14 are disposed axially outwardly, as illustrated in FIG. 2.

A sleeve or constricting strip or band 17 is either slidably telescoped over the rung and ferrule prior to preforming of the end portion of the ferrule, as shown in FIG. 2, or slidably telescoped over the rung and ferrule assembly after preforming of the ferrule as shown in FIG. 3 and 4. In either case, the assembled rung, ferrule and sleeve is next assembled with the box section or tubular rail 18 by inserting the same through a pair of openings 19, 20 in opposite webs 21 and 22 of the rail, as best shown in FIGS. 5 and 6. It will be noted that, in this form of the invention, the aligned openings 19 and 20 in the webs on the opposite sides of the rail are of different diameters, the opening 20 on the inner web 21 adjacent the annulus being shown as smaller than the opening 19 on the opposite web 21 of the rail. A periphery of the sleeve 17 in this form of the invention lies adjacent or abuts the preformed annulus 16 and the edge 23 of the sleeve abuts inner wall edge surfaces of the rail surrounding the opening 20. In FIG. 6 the joint is completed by swaging to form a node 24 surrounding the outer surface of the web or wall 21 of the rail. The ferrule 11 moves relative to the end of the rung 12 as swaging on the outer side of the rail is accomplished. In FIG. 7 the completed assembly of the rung, ferrule, sleeve and rail is shown. FIG. 8 is a cross-sectional view of the same.

In FIG. 9 the parts of the rung-ferrule-sleeve assembly 30 are shown prior to sub-assembly. The sleeve or constricting band or strip 17', it will be noted, which is continuous in the form shown, can be assembled after the ferrule 11' is provided with a preformed annulus as shown in FIGS. 11 and 12 or may be held in position as shown in FIG. 14 or mounted upon a mid-section of the ferrule before the ferrule is provided with a preformed end annulus as in FIG. 12. The sleeve 17, 17' or 17'' in FIGS. 15 to 18 is a separate element, as shown in FIGS. 3, 9 and 13. The primary purpose of the sleeve is to reinforce the sides of the tubular or box section ladder rail 18, so that the rail 18, 18'', as shown in FIG. 5–8 or FIGS. 17,18 and 20 will not collapse during assembly reinforcing the ferrule and rung during assembly and preventing deformation of the ferrule and generating additional strength in the rung-to-rail connection. The rung, ferrule and sleeve assembly, as best shown in FIG. 8, when inserted through openings in the webs of opposite rail sides 22,23, has metal from overhanging ends of the ferrule swaged to form flanges surrounding the aligned openings in the webs of the rail. The rung, ferrule, sleeve and openings in the rail webs may be circular as shown or of D-shape as shown in FIGS. 19, 20 and 21 or of different configurations. The sleeve and ferrule may further be of different relative thickness and/or length and/or of varying cross-sectional shape depending upon the strength and rigidity of the joint desired, and are preferable of malleable material, for example aluminum or aluminum alloy.

As shown, the sleeve placed within the space provided between opposite webs of the rail and over the ferrule may be of different material than the ferrule.

The sleeve is shorter and may be of greater strength than the ferrule to limit the expansion of the same, and the ferrule may be, in such instance, substantially thinner, longer and more ductile than the sleeve and the more ductile ferrule might be used to maximize buckling or flowing characteristics of the ferrule which is also controlled by the constricting band or sleeve.

In the form of FIGS. 1 to 7 inclusive the end of the ferrule 11 is flush with the end of the rung 12. In the form of FIGS. 10 to 18 the ferrule 11' overhangs the rung 12' in a manner similar to that shown in FIGS. 14–17 of U.S. Pat. No. 3,477,120 referred to above.

In FIG. 13 the sleeve 17' is shown adapted to be slidably positioned over the ferrule-rung assembly after the ferrule is preformed with a flange 16' as shown in FIG. 12 and provided with an annular latching valley in the wall of the rung, or, as shown in FIGS. 14 to 18 the sleeve 17'' can be maintained in position on a mid-portion of the ferrule 11'' while the ferrule is being formed with an annulus 16'' at one end which surrounds the wall surfaces around the opening in the inner wall and thereafter formed with an annulus 16'' at the opposite end of the ferrule part extending through the rail on the opposite outer side of the rail which surrounds outer surfaces of the rail as shown in FIG. 18.

In FIGS. 19 to 21 a D-shaped rung 24 is shown having a D-shaped ferrule 25 and a D-shaped sleeve 26 adapted to be assembled thereto.

In FIG. 20 the sleeve 26 abuts at opposite ends an inner node or annulus 29,30 and flanges 31,32 of the ferrule abut the ends of the opposite walls 27,28 on surfaces surrounding the openings 33,34 in the spaced side walls of the rail.

In FIG. 21 a discontinuous non-round band or sleeve 35 is adapted to be disposed over the ferrule 36 which is telescoped over the rung 37 and is adapted particularly where non-round rungs and ferrules are employed.

In the different forms of this invention, as illustrated herein, little change in the cross-section of the sleeve occurs during the forming of the rung-to-rail joint. However, a planned deformation or buckling of the same could be provided. For example, the sleeve may be expanded radially outwardly to tightly engage the opening in the inner web of the side rail and to prevent relative motion between it and the rung, or the rung portion could be expanded outwardly or inwardly to tightly engage the sleeve 17, 17' and the ferrule 11, 11'. Also, the sleeve may be crimped to the ferrule prior to insertion of the rung ferrule assembly into the rail. Further the rung may be radially expanded to tightly engage both the ferrule and the sleeve in the area between the two webs of the side walls of the rail. Moreover the openings in the opposed webs may be of the same size if desired.

While I have described my invention in connection with preferred embodiments, I am aware that numerous and extensive departures may be made therein and that the said rail-to-rung joints could be used in the connection of other structural elements without however departing from the spirit of my invention and the scope of the appended claims.

What I claim is:

1. The method of joining an end portion of a tubular ladder rung to a box-type ladder side rail having spaced side walls and spaced substantially aligned openings in the walls to receive an end portion of the rung therein, which method includes telescoping a malleable ferrule over an end portion of the rung, telescoping a sleeve over a mid-portion of the ferrule, providing flanges at each of the outer ends of the ferrule adapted to engage the outer surfaces of the side walls surrounding the opposite openings in the walls, projecting the assembled ferrule, rung and sleeve through said openings, the sleeve being of substantially less length than the ferrule and abutting at least one inner wall of the rail.

2. The method as set forth in claim 1 wherein the malleable ferrule has a portion overhanging the end portion of the rung and the metal of the overhanging portion is caused to flow into tight engagement with the outer surfaces of the adjacent side wall surrounding the opening on said wall and is formed into a flange surrounding said opening.

3. The method as claimed in claim 1 wherein one of the ferrule flanges is preformed prior to assembly with the tubular rung and sleeve and the opposite flange of the sleeve reinforced ferrule is formed after such assembly.

4. The method of joining an end portion of a tubular element to a box-type or tubular structural member substantially perpendicular to the said first tubular element and having aligned openings therein, which includes steps of positioning a metal ferrule having a radially outwardly preformed flange on the end portion of the tubular element, positioning a sleeve over the telescoped ferrule and tubular element, projecting the assembled ferrule, tubular element and sleeve through said openings, the preformed flange being disposed over one portion of the structural member with its flange in abutment with surfaces of an outer wall of the structural member surrounding one of said openings, the sleeve being contained within the structural member and abutting certain inner wall edge surfaces of the structural member to reinforce the same, flowing metal of the other end of the ferrule radially outwardly into tight engagement with wall surfaces of the opposite sleeve reinforced inner wall of the structural member surrounding the opening in said wall to provide a secure and rigid joint between the said element and member.

5. The method of joining an end portion of a tubular element to a box-type or tubular structural member substantially perpendicular to the said first tubular element and having aligned openings therein, which includes steps of positioning a metal ferrule on the end portion of the tubular element, positioning a sleeve over the telescoped ferrule and tubular element, projecting the assembled ferrule, tubular element and sleeve through said openings, the sleeve being mounted on a mid-portion of the ferrule and disposed within the walls of the structural member, a portion of the sleeve in abutment with surfaces of one inner wall of the structural member surrounding one of said openings, flowing metal of the opposite ends of the ferrule radially outwardly into tight engagement with opposite outer wall surfaces of the structural member surrounding the openings in said wall, the sleeve reinforcing the rail during formation of the opposite end flanges of the ferrule to provide a secure and rigid joint between the said element and member.

* * * * *

UNITED STATES PATENT AND TRADEMARK OFFICE

CERTIFICATE OF CORRECTION

PATENT NO. : 4,656,721

DATED : April 14, 1987

INVENTOR(S) : Richard L. Werner

It is certified that error appears in the above-identified patent and that said Letters Patent is hereby corrected as shown below:

Column 1, line 62, after "rail" please insert period ---.---;

Column 2, line 6, "collagse" should read ---collapse---.

Signed and Sealed this

Eighteenth Day of August, 1987

*Attest:*

DONALD J. QUIGG

*Attesting Officer* *Commissioner of Patents and Trademarks*